(12) United States Patent
Shin et al.

(10) Patent No.: US 10,386,918 B2
(45) Date of Patent: Aug. 20, 2019

(54) METHOD FOR GENERATING AN AUGMENTED REALITY CONTENT AND TERMINAL USING THE SAME

(71) Applicant: Samsung Electronics Co., Ltd., Gyeonggi-do (KR)

(72) Inventors: Daekyu Shin, Gyeonggi-do (KR); Kyusung Cho, Gyeonggi-do (KR); Ikhwan Cho, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 484 days.

(21) Appl. No.: 14/166,321

(22) Filed: Jan. 28, 2014

(65) Prior Publication Data
US 2014/0210710 A1    Jul. 31, 2014

(30) Foreign Application Priority Data
Jan. 28, 2013    (KR) .......................... 10-2013-0009355

(51) Int. Cl.
*G06T 11/60*    (2006.01)
*G06F 3/01*    (2006.01)

(52) U.S. Cl.
CPC .............. *G06F 3/011* (2013.01); *G06F 3/017* (2013.01); *G06T 11/60* (2013.01)

(58) Field of Classification Search
CPC ....... G06T 11/60; G06T 19/006; G06F 3/017; G06F 3/04883; G06F 3/011; G06F 3/0482; G06F 3/0483; A61F 4/00; G09B 21/00; H04M 2203/359; H04M 1/72563; H04M 1/72569; H04M 1/72572; H04M 1/72588; H04M 1/72591; H04M 1/72594; G09G 21/04; G09G 5/377; A63F 2300/695; A61B 2090/364; G06Q 30/0641; G06Q 30/0643; H04N 2005/2726
See application file for complete search history.

(56) References Cited

U.S. PATENT DOCUMENTS

2007/0088354 A1    4/2007    Sugita
2009/0195656 A1*   8/2009    Zhou ...................... G09B 19/00
                                                          348/169

(Continued)

FOREIGN PATENT DOCUMENTS

CN    102763342    10/2012
JP    2007-111148    5/2007
WO    WO 2012/147702    11/2012

OTHER PUBLICATIONS

European Search Report dated Mar. 22, 2017 issued in counterpart application No. 14152801.8-1972; 9 pages.

(Continued)

*Primary Examiner* — Nitin Patel
*Assistant Examiner* — Amen Woldesenbet Bogale
(74) *Attorney, Agent, or Firm* — The Farrell Law Firm, P.C.

(57) ABSTRACT

A method for generating augmented reality content includes receiving an augmented reality mode execution request for generating augmented reality content based on electronic book content, activating a camera in response to the request to provide a preview image, loading book data of the electronic book on the preview image, detecting an event occurring in the augmented reality mode, retrieving reaction data pre-mapped to the event, and loading the reaction data on the preview image.

16 Claims, 5 Drawing Sheets

(56) References Cited

U.S. PATENT DOCUMENTS

| | | | |
|---|---|---|---|
| 2010/0141784 A1* | 6/2010 | Yoo | H04N 5/23219 348/222.1 |
| 2011/0154249 A1 | 6/2011 | Tang et al. | |
| 2011/0191710 A1* | 8/2011 | Jang | G06F 15/025 715/776 |
| 2012/0050324 A1* | 3/2012 | Jeong | G06F 17/30 345/633 |
| 2012/0122570 A1 | 5/2012 | Baronoff | |
| 2012/0231839 A1* | 9/2012 | Seo | G06F 3/017 455/556.1 |
| 2012/0244876 A1* | 9/2012 | Park | G06F 3/0489 455/456.1 |
| 2012/0306918 A1* | 12/2012 | Suzuki | G06F 3/04845 345/633 |
| 2013/0033591 A1* | 2/2013 | Takahashi | G06K 9/50 348/77 |
| 2014/0002443 A1* | 1/2014 | Cunningham | G06T 19/006 345/419 |
| 2014/0055353 A1 | 2/2014 | Takahama | |
| 2014/0063056 A1* | 3/2014 | Zhong | G06Q 30/0641 345/633 |
| 2014/0152873 A1* | 6/2014 | Troxel | H04N 5/2621 348/239 |
| 2014/0201023 A1* | 7/2014 | Tang | G06Q 30/0643 705/26.5 |

OTHER PUBLICATIONS

Chinese Office Action dated Dec. 5, 2017 issued in counterpart application No. 201410041446.9, 27 pages.

* cited by examiner

METHOD FOR GENERATING AN AUGMENTED REALITY CONTENT AND TERMINAL USING THE SAME

PRIORITY

This application claims the benefit under 35 U.S.C. § 119(a) of a Korean patent application filed on Jan. 28, 2012 in the Korean Intellectual Property Office and assigned Serial No. 10-2013-0009355, the entire present invention of which is hereby incorporated by reference.

BACKGROUND OF THE INVENTION

1. Field of the Invention

The present invention relates generally to augmented reality and, in particular, to a method for generating an augmented reality content and a terminal using the content, that is capable of improving user's participation and immersion levels by loading a preview image casting a real environment by reflecting a user's motion, other sensor values, and the data acquired by parsing an electronic book.

2. Description of the Related Art

The advance of digital technologies has seen the proliferation of various types of mobile terminals capable of communicating and processing information, such as mobile communication terminals, Personal Digital Assistants (PDAs), electronic organizers, smartphones, and tablet Personal Computers (PCs).

Such mobile terminals feature various well-known applications for such tasks as messaging, conferencing, organizing, picture-taking, scheduling, gaming, reading, and video.

The e-book is a digital version of a published physical book including information in text and/or images. The e-book is inexpensive compared to paperback books, and may be purchased in part.

The e-book is also capable of being stored in a portable device, giving the user the flexibility to read the e-book while doing other things, such as listening to music.

From the viewpoint of the publisher, the e-book is advantageous in that there is no binding involved, distribution and storage costs are minimal, and of the content of the e-book can be easily updated.

Recently, augmented reality is enriching the e-book with digital animation in order for the user to enjoy the reality of a physical book using a smart device.

An augmented reality book is a new concept e-book. When the augmented reality-enabled electronic device approaches a physical book, an augmented reality animation is played. That is, the augmented reality book is a new technology that reinforces the content of the book with supplementary information implemented in 3-Dimensional (3D) graphics and video.

Since various 2-Dimensional (2D) and 3D graphics and multimedia contents are added to the pages of the e-book, the content of the e-book is enriched and becomes more vivid.

Although the e-book with 3D graphics is known, there is a lack of technology for allowing the user's participation and interaction with e-books, and for satisfying various user requirements.

That is, since it is not possible for one device to reflect every user's behaviors and environmental changes, there is a need in the art for manual operation, such as a touch gesture.

SUMMARY OF THE INVENTION

The present invention provides a method for an augmented reality content generation and a mobile terminal using the augmented reality content, that is capable of improving user's participation level and immersion level by loading the user's motion acquired through a preview image or the reaction data extracted based on the sensor values acquired through various sensors on the preview image, as well as the default data acquired by parsing the e-book.

In accordance with an aspect of the present invention, an augmented reality content generation method includes receiving an augmented reality mode execution request for generating augmented reality content based on electronic book content, activating a camera in response to the request to provide a preview image, loading book data of the electronic book on the preview image, detecting an event occurring in the augmented reality mode, retrieving reaction data pre-mapped to the event, and loading the reaction data on the preview image.

In accordance with another aspect of the present invention, a mobile terminal configured to generate augmented reality content includes a display unit configured to display a preview image converted from an execution screen of an electronic book in an augmented reality mode and presents book data of the electronic book and reaction data retrieved according to an event, a storage unit configured to store the book data, the reaction data, and the preview image on which the book data and reaction data is a loaded, and a control unit configured to activate a camera to acquire the preview image, obtain motion of a user or sensor values in the augmented reality mode, retrieve reaction data based on the motion of the user or sensor values, and load the book data and reaction data to generate the augmented reality content.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE INVENTION

Embodiments of the present invention are described with reference to the accompanying drawings in detail. The same reference numbers are used throughout the drawings to refer to the same or like parts. Detailed descriptions of constructions or processes known in the art may be omitted for the sake of clarity and conciseness.

The configuration of the mobile terminal and control method thereof according to an embodiment of the present invention is not limited to the following description. Various modifications may be made without departing from the scope of the present invention. The following description is made in a hardware approach. However, the present invention includes the technologies using both the hardware and software.

In an embodiment of the present invention, the mobile terminal may be any of the well-known information communication and multimedia devices, including a tablet PC, mobile communication terminal, mobile phone, Personal Digital Assistant (PDA), smartphone, International Mobile Telecommunication 2000 (IMT-2000) terminal, Code Division Multiple Access (CDMA) terminal, Wideband Code Division Multiple Access (WCDMA) terminal, Global System for Mobile communication (GSM) terminal, General Packet Radio Service (GPRS) terminal, Enhanced Data GSM Environment (EDGE) terminal, Universal Mobile Communication Service (UMTS) terminal, digital broadcast terminal, and Asynchronous Transfer Mode (ATM) terminal.

Figure 1:
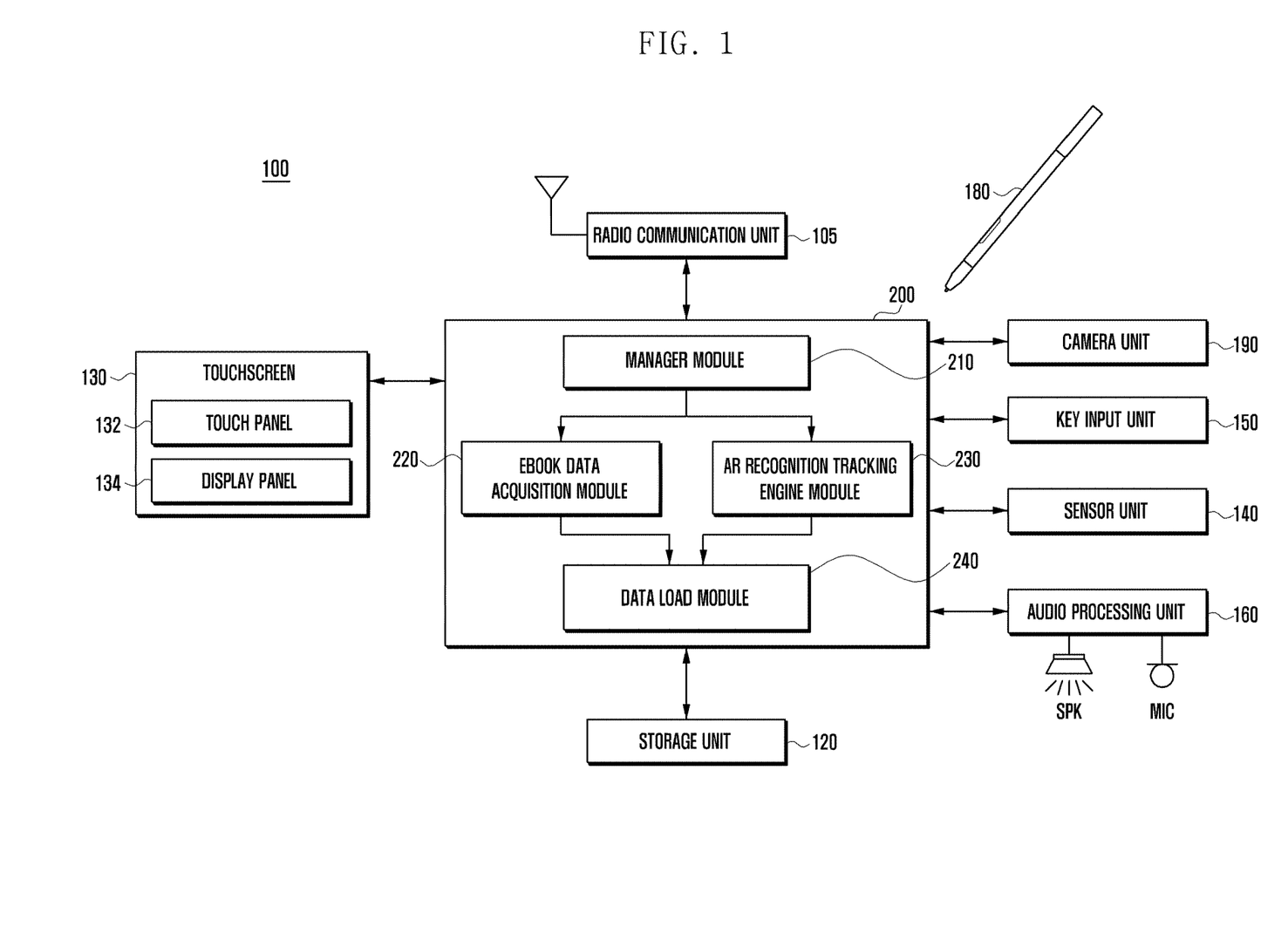
FIG. 1 illustrates a configuration of the mobile terminal, according to an embodiment of the present invention.

FIG. 1 illustrates a configuration of the mobile terminal, according to an embodiment of the present invention.

As shown in FIG. 1, the mobile terminal 100 includes a radio communication unit 105, a control unit 200, a storage unit 120, a touchscreen 130, a sensor unit 140, an audio processing unit 160, a key input unit 150, a stylus pen 180, and a camera unit 190.

The radio communication unit 105 is responsible for radio communication with a base station or other devices. The radio communication unit 105 may be a Radio Frequency (RF) communication unit including a transmitter (not shown) for up-converting and amplifying the transmission signal and a receiver (not shown) for low noise amplifying and down-converting the received signal. The radio communication unit 120 includes a modulator (not shown) and a demodulator (not shown). The modulator modulates the transmission signal and outputs the demodulated signal to the transmitter, and the demodulator demodulates the signal received by the receiver. The modulator/demodulator may be Long-Term Evolution (LTE), Wideband Code Division Multiple Access (WCDMA), Global System for Mobile Communications (GSM), Wi-Fi, and WIBRO. The radio communication unit 105 is capable of connecting to a public radio communication network and/or the Internet to perform radio communication with another terminal. The radio communication unit 105 may be provided with an LTE communication module for communication with an LTE evolved Node B (eNB) and a Wi-Fi communication module.

The storage unit 120 is a memory device of the control unit 200. The storage unit 120 may be a Hard disk, Random Access Memory (RAM), Read Only Memory (ROM), or flash memory. The storage unit 120 may store the data generated inside of the mobile terminal 100 and received from external devices (e.g. server, desktop PC, and tablet PC) through the radio communication unit 105 or an external device connection interface (not shown).

The storage unit 120 stores a booting program and Operating System (OS) for managing the mobile terminal 100.

The storage unit 120 stores embedded applications and third party applications. The embedded applications are installed in the mobile terminal, and include a web browser application, an email application, and an instant messenger application, for example. The third party applications include diverse applications capable of being downloaded from an online market and installed in the mobile terminal 100. The third party applications may be easily installed and controlled. when the mobile terminal 100 powers on, and the booting program is loaded on the main memory device (e.g. RAM) of the control unit 200. The booting program loads the OS on the main memory device to operate the mobile terminal 100. The OS loads the applications on the main memory device.

The touchscreen 130 includes a touch panel 132 and a display panel 134. The touch panel 132 may be placed on the surface of the display panel 134 in an add-on type, or may be inserted into the display panel 134 in an on-cell or in-cell type.

The touch panel 132 generates an analog signal (e.g. touch event) in response to the user's gesture made thereon and converts the analog signal to a digital signal that is sent to the control unit 200.

The control unit 200 detects the user gesture based on the signal from the touch panel 132. The control unit 200 controls the components in response to the user gesture, which may be classified into touch and touch gesture.

The touch gesture includes 'tap', 'drag', and 'flick'. That is, the touch indicates a state of contact on the touchscreen, and touch gesture indicates any change in touched state.

The touch panel 132 can be an integrated touch panel including a hand touch panel for detecting a hand gesture and a pen touch panel for detecting a pen gesture. The hand touch panel is implemented as a capacitive type. The hand touch panel can be implemented as a resistive, infrared, or microwave type.

The hand touch panel is capable of detecting the touch event made by an object (e.g. a conductive material object capable of influencing the electric capacitance) as well as the touch even made by a hand gesture of the user. The pen touch panel can be implemented as an electromagnetic induction type. In this case, the pen touch panel detects the touch event made by a stylus pen 180 manufactured to form a magnetic field.

The touch panel 134 converts the video data input from the control unit 200 to an analog signal for display under the control of the control unit 200. The display panel 134 displays various screens, such as lock, home, environment configuration, and application (App) execution screens, and a keypad.

If a user gesture for screen unlock is detected, the control unit 200 may change the lock screen for the home screen or app execution screen.

The home screen may include multiple pages. The user may select one of the pages such that the selected page is presented. The pages include at least one application execution screen (alternatively, execution image and execution view). The pages include at least one icon representing an application (e.g. environment settings, browser, telephony, and message).

The pages also include at least one application execution screen (alternatively, execution image, execution view), at least one icon, and an empty page. If an icon is selected (e.g. touched) by the user, the control unit 200 executes the corresponding application and controls the display panel 134 to display the execution screen.

The display panel 134 displays one (home screen page) of the above screens on the background and another (e.g. keypad) on the foreground such that the home screen page and keypad overlap. The display panel 134 also may display multiple screens without overlapping each other under the control of the control unit 200. For example, the display panel 134 may display one of the multiple screens on a first screen area and another on a second screen area.

The display panel 134 may be implemented with one of a Liquid Crystal Display (LCD), Organic Light Emitting Diode (OLED), and an Active Matrix OLED (AMOLED).

In an embodiment herein, the display panel 134 may display at least one page of an e-book, a preview image executed in AR mode, default data of the e-book loaded on the preview image, and the user's motion detected through the preview image or reaction data extracted based on the sensor values detected by the sensor unit 140 on the preview image.

The audio processing unit 160 is connected with the speaker (SPK) and microphone (MIC) to perform speech recognition, speech recoding, digital recording, and audio signal input/output for telephony function.

The audio processing unit receives a digital audio signal from the control unit 200, converts the digital audio signal to an analog audio signal, amplifies the analog audio signal, and output the audio signal through the SPK. The audio processing unit 160 converts the analog audio signal input through the MIC)\ to a digital audio signal and outputs the digital audio signal to the control unit 200.

The speaker converts the audio signal received from the audio processing unit 160 to output the audio signal in the form of audible sound waves. The MIC converts the speech and sound wave from other sound sources to audio signal. The speaker may output the speech data converted from the text data of the e-book in the AR mode.

The sensor unit 140 may include, for example, a speed sensor, an acceleration sensor, an altitude sensor, a temperature sensor, a gyro sensor, and a compass sensor. The sensor unit 140 detects the change in physical quantity (such as velocity, acceleration, altitude, temperature, gyro, and compass), and is capable of detecting variation of the change of the external environment, generating sensor values using the detected variation, and transmitting the sensor values to the control unit 200 in the AR mode.

The key input unit 150 includes a plurality of keys (buttons) for receiving alphanumeric information input and function keys for configuring and executing various functions. These keys include a menu key, screen on/off key, power on/off key, and volume control key, for example.

The key input unit 150 generates key signals associated with the user configuration and function control of the mobile terminal 100, to the control unit 200.

The key signals include a power on/off signal, a volume control signal, and a screen on/off signal, for example. The control unit 200 controls the components in response to such key signals. The keys (buttons) of the key input unit 150 are called hard keys while the keys (buttons) presented on the touchscreen 130 are called soft keys.

The control unit 200 controls overlay operations of the mobile terminal 100 and signal flows among the internal components of the terminal 100, processes data, and controls power supply of the battery to the components. The control unit 200 includes a main memory device for storing applications and an Operating System (OS), a cache memory for storing data to be written in and read from the storage unit 120 temporarily, a Central Processing Unit (CPU) and Graphic Processing Unit (GPU). The OS provides an interface between hardware and programs and manages the computing resources such as the CPU, Graphics Processing Unit (GPU), main memory device, and secondary memory device.

That is, the OS operates the mobile terminal 100, schedules tasks, and controls CPU and GPU operations. The OS is responsible for controlling execution of application programs and managing the data and files.

As well known in the art, the CPU is a core control unit of a computer system for executing data operation and comparison and interpreting and executing commands. The GPU is the graphic control unit for performing operation and comparison on the graphic data and interpreting and executing commands related to the graphic data instead of the CPU. Each of the CPU and GPU can be manufactured as a package of two or more independent cores (e.g. quad-core). The CPU and GPU may be integrated as a System on Chip (SoC). The CPU and GPU also may be a multilayer-packaged. The structure of the CPU and GPU can be referred to as Application Processor (AP).

In an embodiment of the present invention, the control unit 200 includes a manager module 210, an e-book content acquisition module 114, an AR recognition tracking engine module 230, and a data load module 118.

The manager module 210 monitors to detect the user's AR mode execution request when a page of the e-book is displayed on the display panel 134 or when the e-book is executed. The manager module 210 executes at least one module related to the AR mode execution upon detecting the AR mode execution request.

When the user's AR mode execution request is detected, the manager module 210 executes the e-book data acquisition module 220, AR recognition tracking engine module 230, data load module 118, and camera unit 190. The AR mode execution request may be input by the user with a soft key presented in the form of text 'AR' on the touchscreen 130, a hard key, or a gesture.

The e-book data acquisition module 220 is activated by the manager module 210 and parses at least one page of the e-book executed already or being executed. Through the e-book parsing, at least one book data pre-stored is mapped to the corresponding page, and the extracted data is displayed on the display panel 134.

The book data includes at least one of text data, image data, 2D graphic data, 3D graphic data, video data, audio data, and vibration data, associated with the corresponding e-book base.

Figure 2:
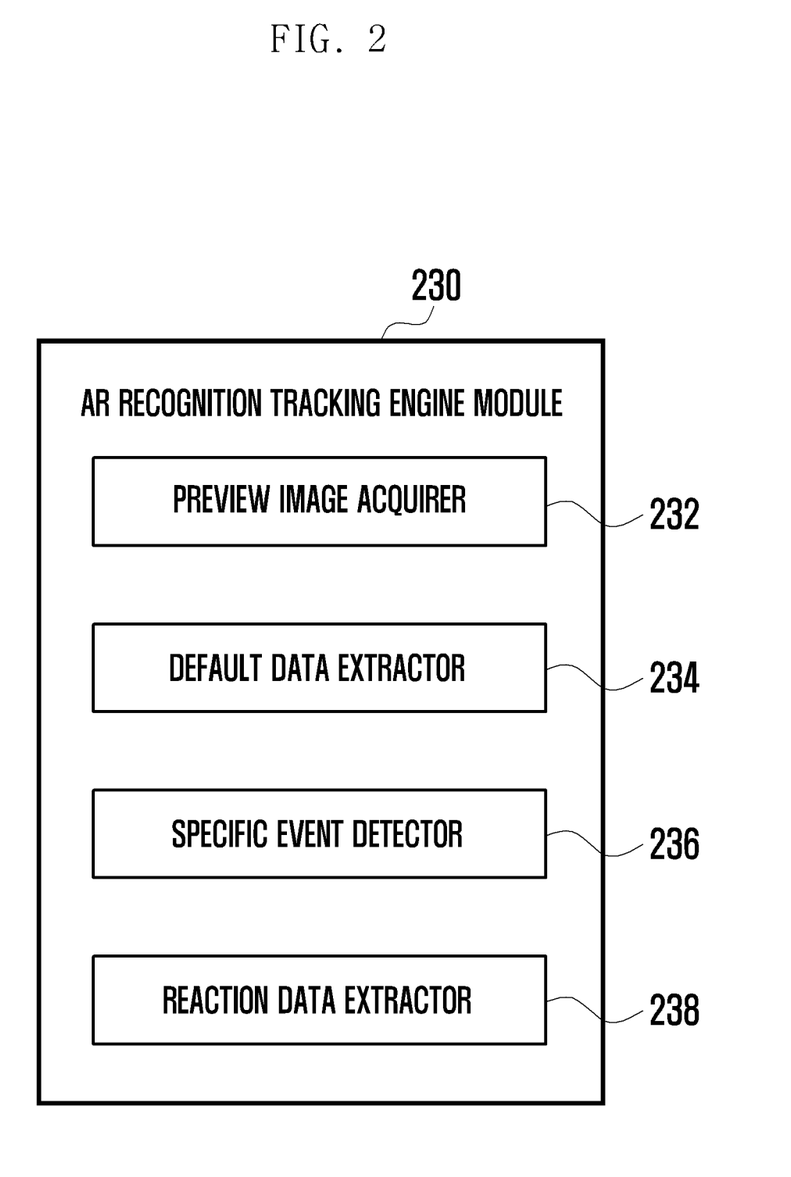
FIG. 2 illustrates a configuration of the Augmented Reality (AR) recognition tracking engine module, according to an embodiment of the present invention.

As shown in FIG. 2, the AR recognition tracking engine module 230 includes a preview acquirer 232, a default data extractor 234, a specific event detector 236, and a reaction data extractor 238.

The preview image acquirer 232 outputs the preview image from the camera unit 190 to the display panel 134. The preview image is taken through the image sensor of the camera unit 190 and displayed on the display panel 134.

The default data extractor 234 extracts the data to be output onto the preview image in the AR mode among the data acquired by the e-book data acquisition module 220.

For example, since the AR mode uses the preview image of the current real user environment as the background, only the character images can be extracted among the image data of the e-book, with the exception of the default background image.

The default data extractor 234 is capable of extracting the audio data along with the preview image. The text data displayed with the execution of the e-book may be converted to speech (text to speech) in the AR mode.

The aforementioned default data is an example, and may be replaced by various data according to the user's or e-book designer's configuration.

The specific event detector 236 detects a user's motion in the preview image acquired through the camera unit 190 executed in the AR mode. The user's motion denotes the movement of the user or an object that is detected through the camera unit 190, or a change in position, angle, and direction of the user or object that the specific event detector 236 is capable of detecting. For example, the surrounding environmental image that has no motion is not detected as a user's motion.

The specific event detector 236 is capable of detecting the user's motion occurring at the same coordinate area as the default data in the preview image.

The specific event detector 236 receives at least one of the sensor values acquired by the various sensors of the sensor unit 140, such as the acceleration sensor, gravity sensor, compass sensor, gyro sensor, temperature sensor, and motion recognition sensor. The motion recognition sensor detects the motion or position of an object and can be implemented as and integrated sensor packaged in one chip with the electromagnetic sensor, acceleration sensor, altimeter, or gyro sensor, for example.

In an embodiment, if the user tilts the mobile terminal at an angle with the horizontal line, the sensor unit 140 detects the slope and generates a sensor value corresponding to the slope to the specific event detector 236.

In another embodiment, if the user blows breath on the MIC, the sensor unit 140 detects the breath of the user and generates a sensor value to the specific event detector 236.

The reaction data extractor 238 may extract the reaction data mapped to the user motion and/or sensor value provided by the specific event detector 236 from the meta table.

The meta table may store the reaction data to be output to the preview image according to a specific event generated in correspondence to the coordinate area of the default data. The reaction data is new data loaded on the preview image according to the specific event, and may be the data changed from or replacing the default data on the preview image.

The meta table may also include the reaction data predetermined to be loaded on the preview image according to the specific event generated at the coordinate area, other than the same coordinate area, as the default data. The reaction data may be loaded on the same coordinate area as the default data or other coordinate area.

The data load module 240 loads the reaction data on the preview image outputting the default data so as to be displayed on the display panel 134. The data load module 240 may load the reaction data changed from the default data in response to a specific event or replacing the default data on the preview image.

Although it is difficult to enumerate all of the functional components that can be converged, the mobile terminal 100 may further include a Global Positioning System (GPS) module, Near Field Communication (NFC) module, and vibration motor. The GPS module may be used to locate the area where the mobile terminal has roamed. The vibration motor may be used to alarm the user for beginning and ending of a specific situation. The mobile terminal 100 may be implemented with or without any of the aforementioned and other components.

Figure 3:
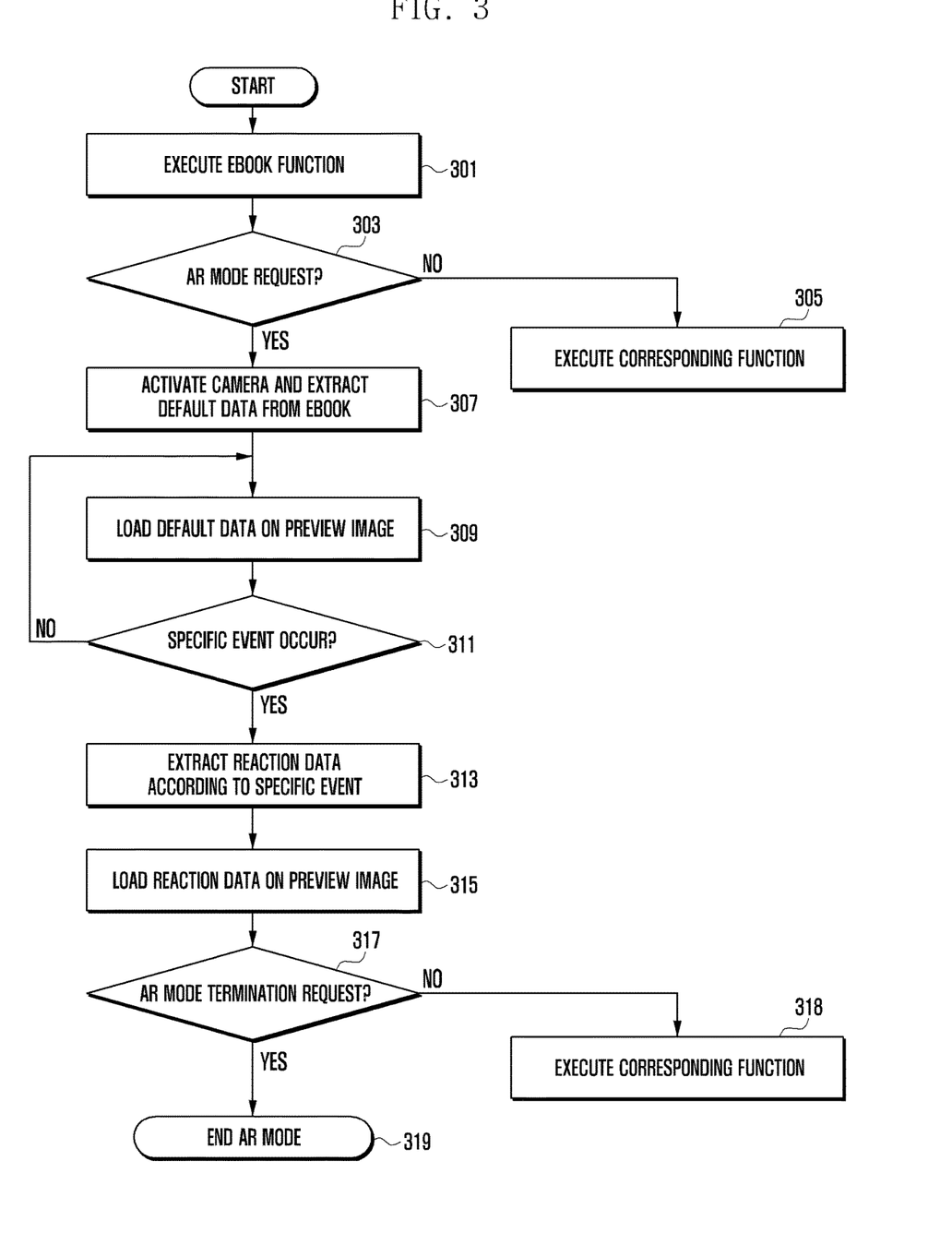
FIG. 3 illustrates an AR content generation method of the mobile terminal, according to an embodiment of the present invention.

FIG. 3 illustrates an AR content generation method of the mobile terminal, according to an embodiment of the present invention.

The control unit 200 executes the e-book function in response to the user request and displays original data selected by the user at step 301. The control unit 200 may display at least one page of the e-book on the display panel 134 of the mobile terminal 100.

The control unit 200 monitors to detect a user request and, if a user request is detected, determines whether the user request is the AR mode request at step 302. As aforementioned, in the AR mode the default data related to the e-book is loaded on the preview image of the real environment, and the reaction data is loaded on the preview image having the default data in response to the occurrence of specific event, so as to generate the AR content. The user may input the AR mode request using a button of the mobile terminal or a touch-based input interface.

If the user request is not the AR mode request, the control unit 200 performs a function corresponding to the user request at step 305. For example, the control unit 200 may display an e-book execution screen or end the e-book in response to the user request.

If the user request is the AR mode request, the control unit 200 executes the camera unit 190 and extracts the default data from the e-book at step 307.

The control unit 200 extracts the data to be displayed on the display panel 134 in the AR mode as default data at least one of the text, image, 2D graphic, 3D graphic, video, audio, and vibration data pre-mapped to the e-book.

When the AR mode uses the preview image of the current real user environment as the background, the control unit 200 is capable of extracting at least one of the aforementioned data, with the exception of the basic background screen image of the e-book in the AR mode. The text data of the e-book may be converted to audio data (text to speech).

The default data may be pre-stored by the e-book designer.

The control unit 200 loads the default data on the preview image at step 309. The control unit 200 may recognize objects, background, and persons in the real environment through the preview image, detect coordinates of the component constituting the real environment, and configure a reference coordinate plane to output the default data and reaction data based on the detection result. That is, the control unit 200 may load the default data on the preview image based on the configured reference coordinate plane.

The control unit 200 determines whether a specific event occurs at step 311. For example, the control unit 200 may detect two events as the specific event.

One of the events may be the user's motion detected through the preview image. The user's motion denotes the movement of the user or an object that is detected through the camera unit 190, or change in position, angle, and direction of the user or object that the control unit 200 is capable of detecting. For example, the surrounding environmental image having no motion is not detected as user's motion.

The control unit 200 may detect the user's motion occurring on the coordinate area corresponding to the default data through the preview image.

The other event may be detected by the sensor unit 140. For example, the change occurring in the mobile terminal, which is detected by at least one of the aforementioned sensors may be regarded as the specific event.

If no specific event is detected, the control unit 200 returns to step 309 to continue loading the default data on the preview image.

If a specific event is detected, the control unit 200 extracts a reaction data in response to the detection of the specific data at step 313. The control unit 200 may retrieve the reaction data pre-mapped to the user motion and/or sensor values extracted from the specific event. The reaction data may be stored as being mapped to the corresponding user motion and sensor values.

For example, the reaction data may be changed from the default data in output form or replace the default data to show the change of the default data on the preview image. The reaction data also may be newly loaded on the preview image in addition to the default data.

The reaction data may be loaded at the same coordinate area as the default data or predetermined coordinate area adjacent to the default data on the preview image.

The reaction data may be configured by the e-book designer or mobile terminal designer and stored in the meta table.

The control unit 200 may load the reaction data on the preview image showing the default data. That is, the control unit 200 loads the reaction data on the preview image along with the default data to display the preview image having the default, and reaction data is displayed on the display panel 134.

The data generated by loading the reaction data extracted in response to the specific event on the preview image on which the default data of the e-book has been loaded already is referred to as AR content.

The control unit 200 determines whether an AR mode termination request is detected at step 317 and, if the AR mode termination request is detected, ends the AR mode at step 319. The control unit 200 may deactivate the camera unit 190 and store the AR content generated at the previous step in the storage unit 120. If there is no AR mode termination request detected at step 317, the method proceeds to step 318 to execute a corresponding function.

The AR content is composed of the default data of the e-book and the reaction data loaded on the preview image of the real environment image at that time when the user has executed the AR mode. Thus, the AR content is new in allowing other users' participation and is realistic as compared to the legacy e-book.

As described above, the AR content generation system and method of the present invention is capable of outputting the preview image of the real environment along with the reaction data retrieved according to the sensor values acquired through various sensors of the mobile terminal as well as the data acquired by parsing the e-book, so as to provide the user with livelier and more realistic e-book AR content.

The AR content generation system and method of the present invention extracts the reaction data in response to the user's motion detected through the preview image and loads the reaction data on the preview image of the real environment, so as to implement user-participating and dynamic AR content, resulting in an improved user's immersion into e-books.

Figure 4:
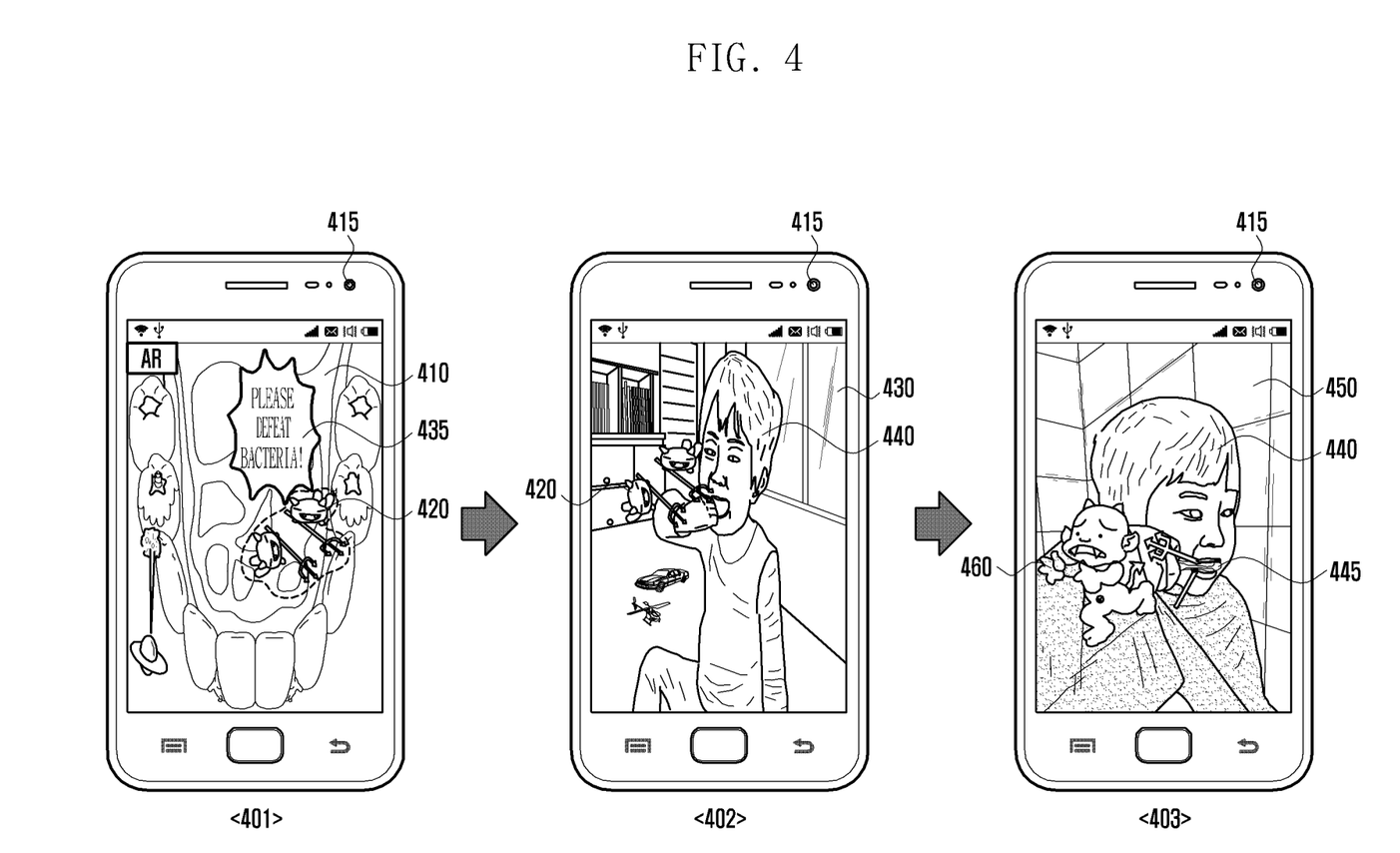
FIG. 4 illustrates screen displays for explaining the AR content generation method, according to an embodiment of the present invention.

FIG. 4 illustrates screen displays for explaining the AR content generation method, according to an embodiment of the present invention.

As shown in FIG. 4, an execution screen shows the original data of the e-book executed in the mobile terminal as shown in display 401.

The execution screen shows one of the pages of the e-book. In detail, an e-book page is shown of a tooth brushing action that includes an oral cavity environment image 410 and certain text data 435. The oral cavity environment image 410 includes a bacterium character image 420.

The execution screen presenting the original data of the e-book may provide a soft key 'AR' for switching the mode to the AR mode as shown in 410 of FIG. 4. If the user request for executing AR mode with the AR key, the control unit 200 switches the mode to the AR mode with the AR mode execution screen as shown in display 402 of FIG. 4.

The AR mode execution screen as shown in display 402 displays the user's actual living room image 430 input through the camera unit 415 as the preview image.

In the AR mode, the control unit 200 may check the coordinates on the preview image input through the camera 415 and recognize objects, persons, and background. It is assumed that a child, living room floor, bookstand, sofa, and toys are distinctively detected.

Among the plural data of the e-book, the bacterium character image data 420 may be displayed on the execution screen as shown in display 402 of FIG. 4, and the text data "please defeat bacteria" of the e-book may be converted to a speech data to be output through the SPK.

The bacterium character image 420 may be the default data preconfigured to be loaded on the preview image when the mode is switched to the AR mode during the execution screen of display 401. The bacterium character image 420 may be configured to be presented at the coordinate area of the person detected in the preview image.

The preview image input through the camera 415 also may change according to the change of the location of the mobile terminal in the AR mode. This indicates that the preview image is a live image of the environment shot in real time.

Although the preview image changes, the control unit 200 may distinguish among persons, objects, and backgrounds with the coordinates on the preview image, and the default data may be displayed at a new coordinate area according to the detected coordinates.

For example, if the mobile terminal moves to the bedroom in the state that the living room is shot as preview as shown in display 402, the bedroom image 450 may be displayed on the execution screen as shown in display 403 of FIG. 4. The bacterium image 420 may be loaded at specific coordinate area of the person.

If a tooth brushing motion 445 is detected at the specific coordinate area 440 of the person, the control unit 200 may load the new reaction data 460 pre-mapped to the tooth brushing motion 445 on the preview image. The new character 460 may be a bacterium character image 460 with a predetermined runaway action. The tooth brushing motion in display 403 of FIG. 4 is the user's motion.

Figure 5:
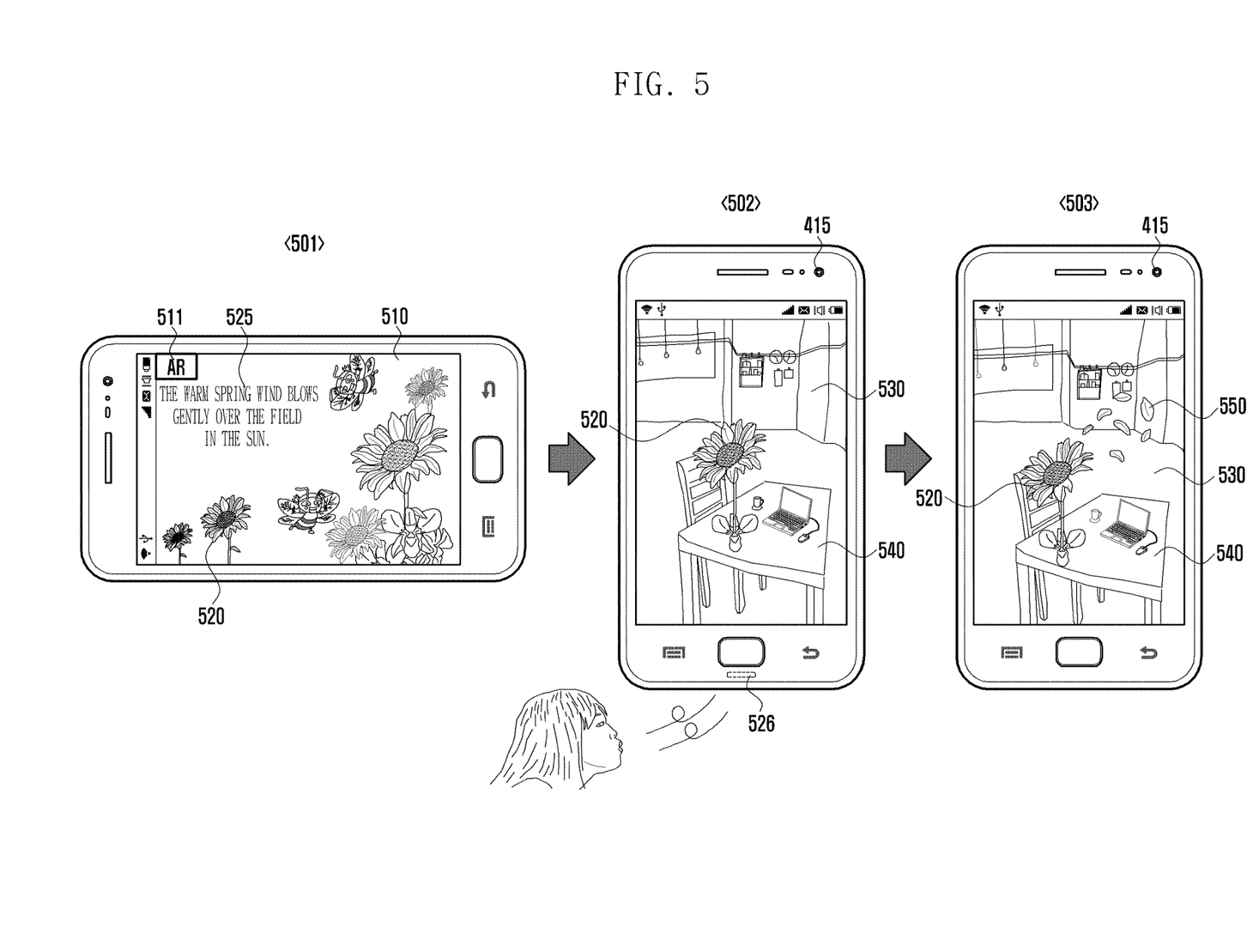
FIG. 5 illustrates screen displays for explaining a procedure of loading AR content in the AR content generation method, according to an embodiment of the present invention.

FIG. 5 illustrates screen displays for explaining a procedure of loading AR content in the AR content generation method, according to an embodiment of the present invention.

As shown in FIG. 5, the execution screen of display 501 displays the original data of the e-book executed by the mobile terminal. For example, the execution screen of display 501 includes a sky image 510 as the background, a dandelion image 520, and text data 525 as a part of the e-book.

The execution screen displaying the original data of the e-book as shown in display 501 may provide a mark 'AR' 511 capable of switching to the AR mode. If the user selects the mark 511, the mode of the e-book is switched to the AR mode as shown in the execution screen of display 502.

The AR mode execution screen as shown in display 502 shows an image of a room of the user, which is input through the camera 415 lively as the preview image 530.

The control unit 200 checks the coordinates of the area recognized as a flat surface and loads the dandelion image 520 as default data on the flat surface coordinate area. Such execution may also be preconfigured by the control unit 200.

The execution screen 503 shows a preview image on which the dandelion image 520 is loaded on the coordinate area 540 of a desk that the control unit 220 recognizes as flat surface partially.

While the dandelion image 520 is loaded, the text data "The warm spring wind blows gently over the field in the sun" is converted to speech data to be output through the SPK.

If the user blows his/her breath on a blow sensor 526 of the mobile terminal, the blow sensor 526 generates a sensor value corresponding to the blown breath to the control unit 200, such that the control unit 200 retrieves reaction data 550 based on the sensor value and loads the reaction data 550 on the preview image as shown in the execution screen of display 503.

For example, the control unit 200 retrieves the image data 550 of flower petals whirling in the wind which is pre-mapped to the sensor value from the mapping table and loads the image data around the coordinate area of the dandelion image 520 and/or on the same coordinate area of the dandelion image 520.

As described above, the AR content generation method and mobile terminal of the present invention are capable of displaying the preview image of the real environment along with the reaction data retrieved according to the sensor value acquired through various sensors of the mobile terminal, as well as the data acquired by parsing the e-book, thereby providing livelier e-book content and more realistic AR content.

Also, the AR content generation method and mobile terminal according to the present invention are capable of retrieving reaction data in response to the user's motion detected through the preview image, and loading the reaction data on the preview image of the real environment, thereby implementing user-participating and dynamic AR content and improving an immersion level of the e-book reader.

The above-described AR content generation method and apparatus of a mobile terminal according to an embodiment of the present invention can be implemented in the form of computer-executable program commands and stored in a computer-readable storage medium. The computer readable storage medium may store the program commands, data files, and data structures in individual or combined forms. The program commands recorded in the storage medium may be designed and implemented for various embodiments of the present invention or used by those skilled in the computer software field. The computer-readable storage medium includes magnetic media such as a floppy disk and a magnetic tape, optical media including a Compact Disc (CD) ROM and a Digital Video Disc (DVD) ROM, a magneto-optical media such as a floptical disk, and the hardware device designed for storing and executing program commands such as ROM, RAM, and flash memory. The programs commands include the language code executable by computers using the interpreter as well as the machine language codes created by a compiler. The aforementioned hardware device can be implemented with one or more software modules for executing the various embodiments of the present invention.

Although preferred embodiments of the present invention have been described using specific terms, the specification and drawings are to be regarded in an illustrative rather than a restrictive sense in order to help understand the present invention. Various changes in form and detail may be made herein without departing from the spirit and scope of the invention as defined by the appended claims.

What is claimed is:

1. An augmented reality content generation method in a mobile terminal having a touch screen, a camera and a sensor unit, comprising:

receiving, while displaying content, an augmented reality mode execution request for generating the augmented reality content based on the content;

executing the camera in response to the request, and displaying, on the touch screen, a preview image captured by the camera, the preview image being a live image of a real environment of a user;

loading default book data of the electronic book on the preview image;

storing, in a mapping table, reaction data mapped to motions of the user and sensor values generated by the sensor unit;

detecting an event occurring in the augmented reality mode, wherein detecting the event comprises at least one of detecting a motion of the user in the preview image and detecting the sensor values obtained by the sensor unit;

extracting the reaction data pre-mapped to the event;

loading the extracted reaction data on the preview image;

receiving an augmented reality mode termination request; and in response to the augmented reality mode termination request, ending the augmented reality mode, and storing the default book data, the reaction data and the preview image, wherein the default book data and the reaction data are loaded on the preview image.

2. The method of claim 1, further comprising selecting the augmented reality content to be presented on the preview image from the content in the augmented reality mode.

3. The method of claim 1, further comprising:

recognizing an object, person, and background of a real environment provided as the preview image; and determining the coordinates of the object, person, and background on the preview image.

4. The method of claim 3, wherein the reaction data is output at an identical coordinate area as the augmented reality content or another coordinate area adjacent to the augmented reality content.

5. The method of claim 3, wherein the augmented reality content is output on an area of reference coordinates recognized as a flat surface through coordinate detection on the preview image.

6. The method of claim 1, wherein the sensor unit comprises at least one of acceleration sensor, gravity sensor, compass sensor, gyro sensor, temperature sensor, and motion sensor.

7. The method of claim 1, wherein the reaction data changes a shape of the augmented reality content or replaces the augmented reality content according to the detection of the event.

8. The method of claim 1, wherein the augmented reality content comprises at least one of character image data, audio data, vibration data, video data, 2-Dimensional (2D) graphic data, and 3D graphic data, with the exception of basic background image data.

9. The method of claim 1, further comprising:

outputting the augmented reality content on the preview image, wherein outputting the augmented reality content comprises:

converting text data of the content to speech data; and outputting the speech data.

10. A mobile terminal configured to generate augmented reality content, the terminal comprising:

a touchscreen;

a camera;

a speaker;
a sensor unit
a memory; and
a processor,
wherein the processor is configured to:
receive, while displaying content, an augmented reality mode execution request for generating the augmented reality content based on the content,
execute the camera in response to the request, and display, on the touch screen, a preview image captured by the camera, the preview image being a live image of a real environment of a user,
load default book data of the electronic book on the preview image,
store, in a mapping table, reaction data mapped to motions of the user and sensor values generated by the sensor unit,
detect an event occurring in the augmented reality mode, wherein detecting the event comprises at least one of detecting a motion of the user in the preview image and detecting the sensor values obtained by the sensor unit,
extract the reaction data pre-mapped to the event,
load the extracted reaction data on the preview image,
receive an augmented reality mode termination request, and
in response to the augmented reality mode termination request, end the augmented reality mode, and store the default book data, the reaction data and the preview image,
wherein the default book data and the reaction data are stored on the preview image.

11. The terminal of claim 10, wherein the processor comprises:
an electronic book data acquisition module which parses at least one page of the electronic book to extract the book data and sends the book data to the display unit;
a preview image acquirer which acquires the preview image from the camera;
a default data extractor which extracts the augmented reality content from the content to be output onto the preview image in the augmented reality mode;
a specific event detector which detects motion of the user or acquires sensor values in the augmented reality mode;
a reaction data extractor which extracts the reaction data corresponding to the motion of the user or the sensor values; and
a manager module which activates the preview image acquirer, default data extractor, specific event detector, and reaction data extractor in response to the augmented reality mode execution request.

12. The terminal of claim 10, wherein the processor is further configured to recognize an object, person, and background of a real environment provided as the preview image and to determine the coordinates of the object, person, and background on the preview image.

13. The terminal of claim 12, wherein the reaction data is output at an identical coordinate area as the augmented reality content or other coordinate area adjacent to the augmented reality content.

14. The terminal of claim 12, wherein the augmented reality content is output on an area of reference coordinates recognized as a flat surface through coordinate detection on the preview image.

15. The terminal of claim 10, wherein the reaction data changes a shape of the augmented reality content or replaces the augmented reality content according to the detection of the event.

16. The terminal of claim 10, wherein the augmented reality content comprises at least one of character image data, audio data, vibration data, video data, 2-Dimensional (2D) graphic data, and 3D graphic data, with the exception of basic background image data.

* * * * *